(12) United States Patent
Davino

(10) Patent No.: US 10,295,092 B2
(45) Date of Patent: May 21, 2019

(54) SECURITY ADAPTER

(71) Applicant: Neoperl GmbH, Mullheim (DE)

(72) Inventor: David Davino, Prospect, CT (US)

(73) Assignee: Neoperl GmbH, Müllheim (DE)

( * ) Notice: Subject to any disclaimer, the term of this patent is extended or adjusted under 35 U.S.C. 154(b) by 1387 days.

(21) Appl. No.: 14/261,951

(22) Filed: Apr. 25, 2014

(65) Prior Publication Data
US 2015/0308591 A1 Oct. 29, 2015

(51) Int. Cl.
*F16L 15/06* (2006.01)
*E03C 1/02* (2006.01)
*F16L 35/00* (2006.01)
*E03C 1/04* (2006.01)

(52) U.S. Cl.
CPC .............. *F16L 15/06* (2013.01); *E03C 1/025* (2013.01); *F16L 35/00* (2013.01); *E03C 1/0408* (2013.01); *F16L 2201/20* (2013.01)

(58) Field of Classification Search
CPC ....... F16L 15/06; F16L 27/0808; F16L 27/12; F16L 35/00; E03C 1/025
USPC .......... 285/355, 390, 392, 8, 98, 148.4, 272, 285/275, 278, 280–282
See application file for complete search history.

(56) References Cited

U.S. PATENT DOCUMENTS

| | | | | |
|---|---|---|---|---|
| 2,702,715 A | * | 2/1955 | Andrews | F16L 15/02 223/37 |
| 2,828,978 A | * | 4/1958 | Wurzburger | F16L 29/04 137/614.03 |
| 3,565,464 A | * | 2/1971 | Wolf | A47L 9/242 285/321 |
| 4,625,998 A | * | 12/1986 | Draudt | A47L 9/242 285/110 |
| 8,091,587 B1 | | 1/2012 | Schwartz | |

* cited by examiner

*Primary Examiner* — Aaron M Dunwoody
*Assistant Examiner* — Fannie C Kee
(74) *Attorney, Agent, or Firm* — Volpe and Koenig, P.C.

(57) ABSTRACT

A security adapter, which is provided for connecting a first and a second fluid line portion of a fluid line. The security adapter has an inner sleeve, which at a first sleeve end region has a fastening thread provided for connection to a first fluid line portion and at a second sleeve end region has an outer thread in the form of a movement thread. The outer thread can be screwed together with an inner thread of an outer sleeve, wherein the sleeve inner circumference of the outer sleeve is provided with a stop, against which a counter stop arranged on the outer circumference of the inner sleeve bears, in a rotational end position of the security adapter such that the inner sleeve and the outer sleeve are freely rotatable in relation to one another without engagement of the inner and outer thread forming the movement thread. In a screwed-in end position, the inner sleeve is screwed by way of its outer thread into the inner thread of the outer sleeve such that a stop surface on the inner sleeve bears against a counter stop surface on the outer sleeve.

19 Claims, 4 Drawing Sheets

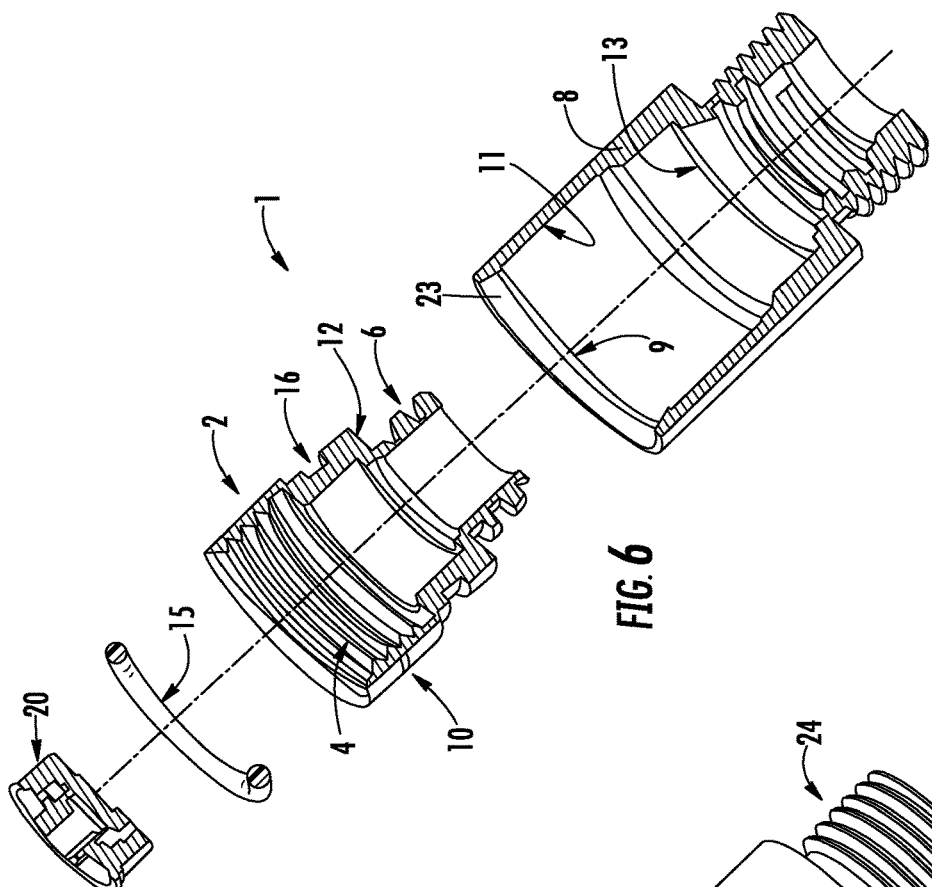
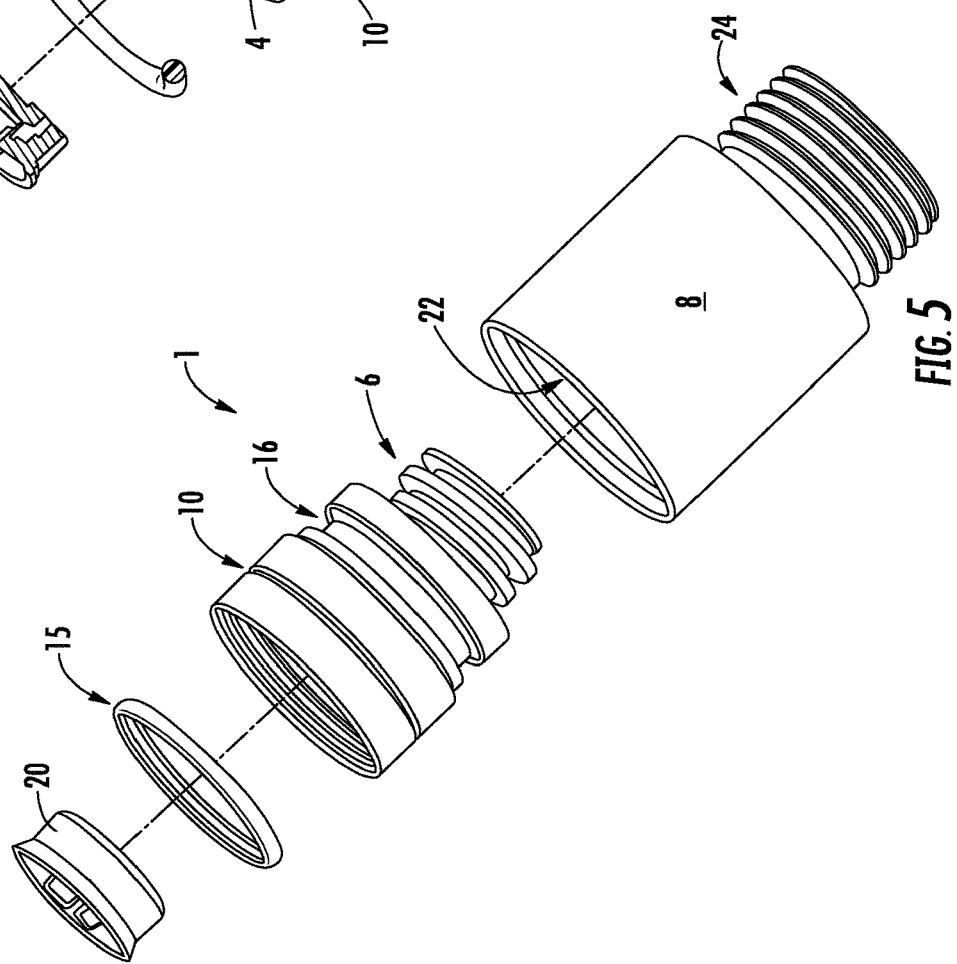

SECURITY ADAPTER

BACKGROUND

The invention relates to a security adapter which is provided for the connection of at least one fluid line portion. This security adapter can be installed, for example, between a pipe line or a similar sanitary line or a water intake valve on the one hand and a sanitary outlet, for instance a shower spray head or shower hose, and is intended to counteract improper release of the connection made with the security adapter.

It is known that on the one hand a large amount of water is consumed in the sanitary sector, for example during showering, whilst on the other hand less and less water is available for this purpose. In order to counteract this discrepancy and to save water, what are termed flow rate regulators have been developed, these ensuring that the quantity of water which emerges, for example, during showering does not exceed a specific maximum flow rate and pressure fluctuations in the supplying water line are compensated for. The flow rate regulators known from the prior art are therefore usually interposed in the connection between a shower spray head and a water feed line, for example a hose, or instead in the connection between the mixer faucet of a shower on the one hand and a water line, for example a hose, on the other hand. In this way, it is readily possible even for untrained users to replace the flow rate regulator or to remove it entirely generally without the use of a tool, for example in order to increase or to reduce the quantity of water supplied.

Country-specific regulations, for example in the USA, provide that sanitary devices such as shower spray heads have to be operated with such a flow rate regulator. In addition to the use of flow rate regulators, the US Government's Energy Policy Act of 1992 also stated that these must not be manipulated, in order for instance to change the quantity of water which emerges. Complete removal of the flow rate regulators is also no longer permissible.

An apparatus which is directed to this problem is already known from the prior art. U.S. Pat. No. 8,091,587 B1 describes the assembly of the legally prescribed flow rate regulator by means of an adapter, which adapter is located behind the wall and is connected to a water intake valve. For assembly and disassembly, this adapter has a hexagon socket, which is arranged on the outflow side downstream of the flow rate regulator. A shower spray head is fastened downstream of the adapter in the direction of flow by means of an upstream pipe with a thread.

This apparatus which is known from the prior art has the disadvantage that the flow rate regulator which is located behind the wall can also be removed easily by untrained users. This merely needs a hexagonal tool, in order to remove the adapter once the shower spray head or shower hose has been removed and in order to thereby get at the flow rate regulator. Hexagonal tools of this type are also readily available to the untrained user, since the use thereof is common in various technical fields.

SUMMARY

It is therefore an object of the invention to provide a security adapter of the type mentioned in the introduction, with which it is possible to secure the connection to at least one fluid line portion in such a manner that unauthorized release of this connection is prevented.

In the case of the security adapter of the type mentioned in the introduction, the solution to this problem is provided by the features of the invention.

The security adapter according to the invention has an inner sleeve, which at a first sleeve end region has a fastening thread provided for connecting the security adapter to a first fluid line portion. At the opposite, second sleeve end region, the security adapter has an outer thread, which by contrast is in the form of a movement thread. The outer thread provided on the inner sleeve can be screwed together with an inner thread, which inner thread is provided on an outer sleeve. The fastening thread has a considerably higher degree of friction compared to the movement thread and can also have a self-locking configuration. The sleeve inner circumference of the outer sleeve is provided with a stop, against which a counter stop arranged on the outer circumference of the inner sleeve bears, in a rotational end position of the security adapter, in such a manner that the inner sleeve and the outer sleeve are freely rotatable in relation to one another without engagement of the inner and outer thread forming the movement thread. By contrast, in a screwed end position, the inner sleeve is screwed by way of its outer thread into the inner thread of the outer sleeve in such a manner that a stop surface on the inner sleeve bears against a counter stop surface on the outer sleeve. If the inner sleeve has been screwed completely into the outer sleeve and the stop surface provided on the inner sleeve bears against the associated counter stop surface of the outer sleeve, a torque exerted on the outer sleeve will in this screwed-in end position be transferred to the inner sleeve, such that the inner sleeve can also be screwed forcefully by way of its fastening thread onto a counter thread of the first fluid line portion. If in particular an unauthorized user wishes to release this connection again by acting with a corresponding torque on the outer circumference of the outer sleeve, firstly the considerably more smooth running movement thread between the inner sleeve and the outer sleeve is released, whereas the inner sleeve remains securely held with the fastening thread on the first fluid line portion. Since release of the fastening thread is not possible particularly in the rotational end position, in which the outer sleeve and the inner sleeve are freely rotatable in relation to one another, the security adapter also continues to remain securely and firmly held with the fastening thread of the inner sleeve thereof on the first fluid line portion, and the sleeve interior of the outer and inner sleeve remains unreachable to this user for the time being.

In order that the fastening thread provided on the inner sleeve itself remains firmly connected to the first fluid line portion when a torque exerted on the outer sleeve releases the movement thread provided between the outer sleeve and the inner sleeve, it is advantageous if the fastening thread provided for connection to the first fluid line portion is configured as a steep thread or as a V-thread. A particularly simple and preferred embodiment according to the invention provides that the fastening thread arranged on the inner sleeve is an inner thread. Whereas the outer thread can be provided on the sleeve outer circumference of the inner sleeve, the fastening thread is in the form of an inner thread on the inner circumference of the inner sleeve.

One embodiment according to the invention, in which the movement thread is distinguished by a significantly lower frictional force in the direction of rotation compared to the fastening thread, provides that the outer thread of the movement thread provided on the inner sleeve is a trapezoidal thread. On account of its relatively small flank angle and accordingly minor wedge action of the trapezoidal thread on its flanks, significantly lower friction is caused. In order to use the security adapter according to the invention for connecting two adjacent fluid line portions of a fluid line and in particular of a water line, it is expedient if the outer sleeve bears an outer thread for connection to a second fluid line portion.

One preferred development according to the invention is provided in the fact that provision is made of at least one ring seal, which seals an annular gap that remains between the inner sleeve and the outer sleeve. The fluid line which comprises the first and second fluid line portions connected by means of the security adapter according to the invention is also leakproof and watertight in the region of the security adapter, in the screwed end position, if provision is made of at least one ring seal which seals an annular gap that remains between the inner sleeve and the outer sleeve.

In this respect, a preferred embodiment according to the invention provides that at least one annular groove for receiving a sealing ring serving as the ring seal is provided on the sleeve outer circumference of the inner sleeve.

In order to reveal possibly also unauthorized loosening of the connection made with the aid of the security adapter according to the invention, it is provided that the at least one ring seal seals the annular gap in the screwed end position, and by contrast in the rotational end position is arranged in the region of a cross-sectional widening of the clear sleeve cross section of the outer sleeve in such a manner that the ring seal is functionless and the annular gap that remains between the outer sleeve and the inner sleeve is therefore permeable to fluid. Since, therefore, the ring seal provided in the security adapter according to the invention becomes functionless in the rotational end position, the fluid flowing through the security adapter can flow outward past the ring seal, and, through uncontrolled spraying of the fluid, reveals that the connection made with the aid of the security adapter according to the invention has been tampered with.

It can be advantageous if, in the rotational end position of the security adapter, the inner sleeve protrudes beyond the adjacent end face of the outer sleeve by way of a sleeve end region facing toward the first fluid line portion. Using a suitable and correspondingly narrow tool, for example also a narrow pipe wrench, the inner sleeve can be grasped at its sleeve end region protruding beyond the adjacent end face of the outer sleeve and rotated with respect to the outer sleeve in such a manner that the inner sleeve is released with its fastening thread from the counter thread on the first fluid line portion. As a result of the inner sleeve being released from the counter thread on the first fluid line portion, the sleeve inner space of the inner sleeve and a functional element provided therein also become accessible. A relatively small overhang of the sleeve end region of the inner sleeve protruding beyond the outer sleeve means that the connection made with the aid of the security adapter according to the invention can be released only with a correspondingly narrow special tool.

In order to make it possible for the inner sleeve to be screwed together with the fastening thread thereof onto the counter thread on the first fluid line portion when a torque is applied to the outer sleeve situated in the screwed end position, it is advantageous if a first tool engagement surface is provided on the outer sleeve.

In order to make it possible for the fastening thread to be released when required from the counter thread on the first fluid line portion using a suitable tool, it can be advantageous if a second tool engagement surface is provided on the protruding sleeve end region of the inner sleeve.

In this respect, particularly simple and advantageous embodiments according to the invention consist in the fact that the tool engagement surface(s) is or are formed in each case by at least one circumferential spanner engagement surface on the outer sleeve and/or inner sleeve.

In order to protect a functional element interposed in the fluid line against unauthorized access, it is advantageous if a flow rate regulator, a pressure reduction valve or a backflow preventer is provided and preferably held releasably in the sleeve inner space of the inner sleeve. With the aid, for example, of the flow rate regulator held securely in the sleeve inner space of the inner sleeve, it is possible for the flow rate of the water flowing through to be automatically adjusted in such a manner that a defined maximum flow rate is not exceeded. In addition to or instead of the flow rate regulator, however, a backflow preventer or a pressure reduction valve can also be provided in the sleeve inner space of the inner sleeve.

In order to make it possible for the security adapter according to the invention to be used as a coupling piece between two adjacent fluid line portions of a fluid line, it is advantageous if the security adapter connects the first and the second line portion of a fluid line and preferably of a water line to one another.

In this respect, a preferred application is one in which the security adapter is provided for connection to an outflow-side first or second water line portion in the form of a spray head or shower hose.

For simplified installation of the security adapter according to the invention, it is advantageous if, in order for its outer thread to be screwed into the inner thread of the outer sleeve, the inner sleeve can be inserted into the sleeve inner space of the outer sleeve by way of an end-side insertion opening, and if a preferably circumferential insertion bevel which widens conically in the insertion direction is arranged upstream of the stop on the sleeve inner circumference of the outer sleeve. In this embodiment, the inner sleeve is pushed into the end-side insertion opening in the outer sleeve until the end edge of the inner sleeve which has been pushed in runs onto the preferably circumferential insertion bevel which is provided on the sleeve inner circumference of the outer sleeve and widens conically in the insertion direction. By the exertion of further pressure on the inner sleeve, the counter stop arranged on the outer circumference of the inner sleeve can overcome the stop arranged on the sleeve inner circumference of the outer sleeve, until the inner sleeve and the outer sleeve are held loosely, but nevertheless non-releasably, against one another. By virtue of the inner sleeve being pushed further into the sleeve inner space of the outer sleeve, the outer thread provided on the face-end region of the inner sleeve is moved into engagement with the inner thread on the sleeve inner circumference of the outer sleeve, such that this movement thread between the outer sleeve and the inner sleeve can be screwed together up to the screwed end position.

In order to make it possible for an appropriate torque to be applied to the security adapter according to the invention during assembly, it is advantageous if the outer sleeve of the security adapter is produced from metal and preferably from brass.

A particularly simple embodiment according to the invention which can easily be achieved provides that the inner sleeve is produced from metal or from plastic, preferably from POM plastic.

In order that the screw connection provided between the inner sleeve and the outer sleeve can easily be released, without this also being associated with loosening of the fastening thread which holds the inner sleeve on the first fluid line portion, it is advantageous if the outer thread of the inner sleeve or the inner thread of the outer sleeve has a greater thread pitch than the fastening thread of the inner sleeve. In this respect, preference is given to an embodiment in which the fastening thread on the inner sleeve, which is in the form for example of an inner thread, has a greater pitch compared to the inner thread of the movement thread provided in the outer sleeve.

Developments according to the invention become apparent from the claims in conjunction with the description and also the drawing. The invention will be described in even greater detail hereinbelow with reference to a preferred exemplary embodiment.

BRIEF DESCRIPTION OF THE DRAWINGS

In the drawings:

FIG. 5 shows the security adapter shown in FIGS. 1 to 4 in an exploded perspective illustration of its individual parts, FIG. 6 shows the security adapter shown in FIGS. 1 to 5 in an exploded cross-sectional illustration of its individual parts in longitudinal section.

DETAILED DESCRIPTION OF THE PREFERRED EMBODIMENTS

Figure 1:
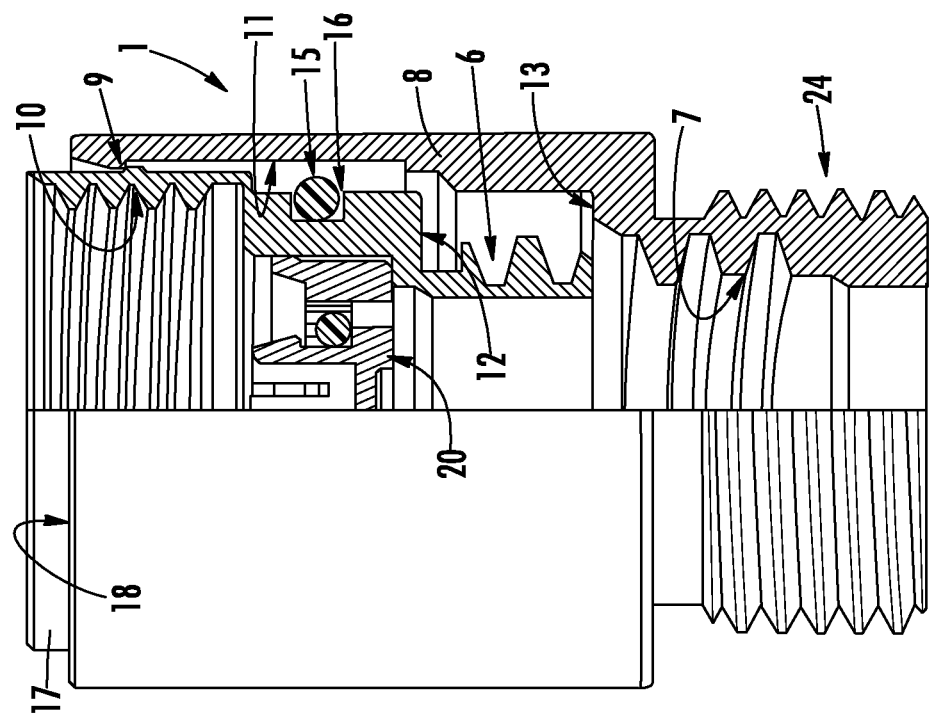
FIG. 1 shows a security adapter, shown in a partial longitudinal section, with an inner sleeve, which inner sleeve has been screwed with an outer thread, in the screwed end position of the security adapter shown here, into an inner thread of an outer sleeve in such a manner that the inner sleeve has entered completely into the sleeve inner space of the outer sleeve.

FIGS. 1 to 8 show a security adapter 1, 1' with an inner sleeve 2, which inner sleeve 2 at a first sleeve end region 3 has a fastening thread 4 provided for connecting the security adapter 1, 1' to a first fluid line portion 5. At the opposite, second sleeve end region, the security adapter 1, 1' has an outer thread 6, which by contrast is in the form of a movement thread. The outer thread 6 provided on the inner sleeve 2 can be screwed together with an inner thread 7, which inner thread 7 is provided on an outer sleeve 8. The fastening thread 4 has a considerably higher degree of friction compared to the movement thread formed from the outer thread 6 and inner thread 7 and can also have a self-locking configuration.

Figure 2:
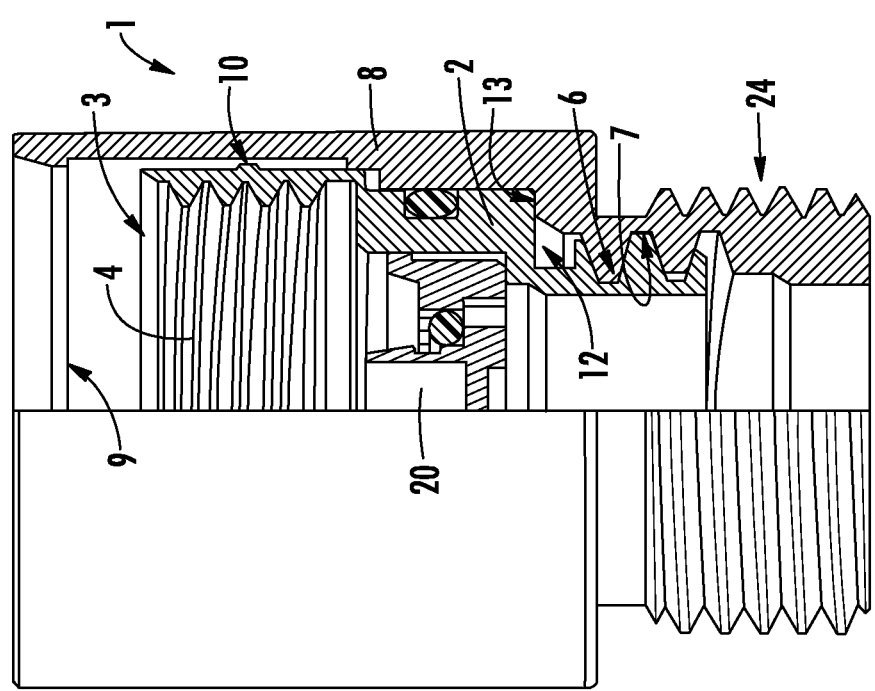
FIG. 2 shows the security adapter shown in FIG. 1, likewise shown as a partial section, in a rotational end position, in which rotational end position the inner sleeve and the outer sleeve are freely rotatable in relation to one another without engagement of the outer thread and of the inner thread, and in which rotational end position the inner sleeve protrudes slightly with the first sleeve end region thereof beyond the adjacent end face of the outer sleeve.
Figure 4:
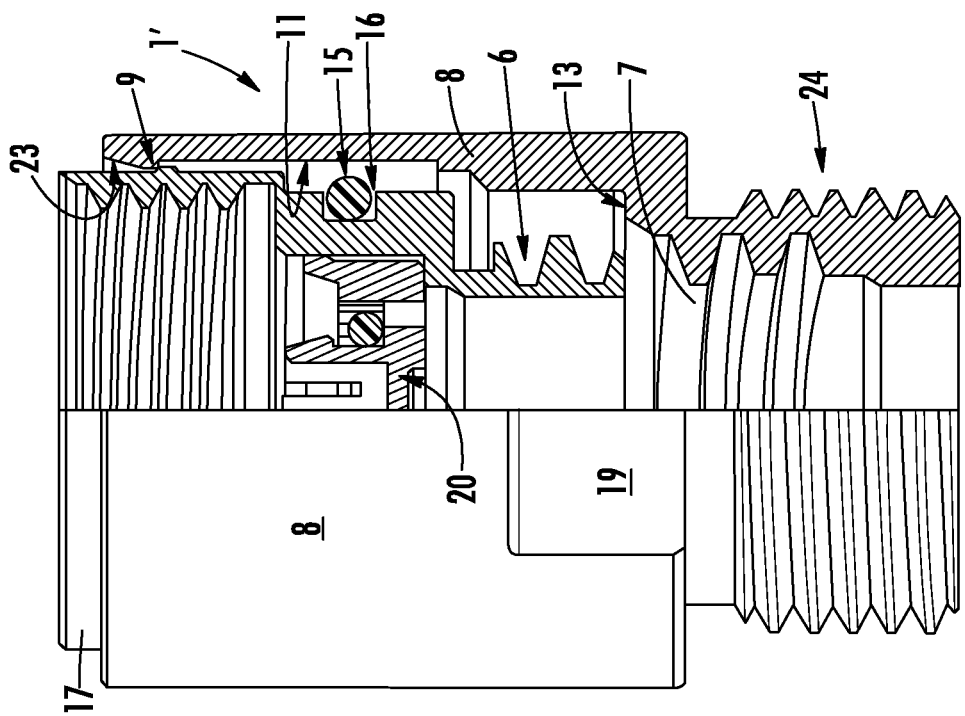
FIGS. 3 and 4 show the security adapter shown in FIGS. 1 and 2, which here has at least one tool engagement surface on the sleeve outer circumference of its outer sleeve.

The sleeve inner circumference of the outer sleeve 8 is provided with a stop 9, against which a counter stop 10 arranged on the outer circumference of the inner sleeve 2 bears, in the rotational end position of the security adapter 1, 1' shown in FIGS. 2 and 4, in such a manner that the inner sleeve 2 and the outer sleeve 8 are freely rotatable in relation to one another without engagement of the inner and outer thread 7, 6 forming the movement thread. By contrast, in the screwed end position shown in FIGS. 1 and 3, the inner sleeve 2 is screwed by way of its outer thread 6 into the inner thread 7 of the outer sleeve 8 in such a manner that a stop surface 12 on the inner sleeve 2 bears against a counter stop surface 13 on the outer sleeve 8. If the inner sleeve 2, in the screwed end position shown in FIGS. 1 and 3, has been screwed completely into the outer sleeve 8 and the stop surface 12 provided on the inner sleeve 2 bears against the associated counter stop surface 13 of the outer sleeve 8, a torque exerted on the outer sleeve 8 will in this screwed-in end position be transferred to the inner sleeve 2, such that the inner sleeve 2 can also be screwed forcefully by way of its fastening thread 4 onto a counter thread of the first fluid line portion 5. If in particular an unauthorized user wishes to release this connection again by acting with a corresponding torque on the outer circumference of the outer sleeve 8, firstly the considerably more smooth running movement thread formed from the outer thread 6 and inner thread 7 between the inner sleeve 2 and the outer sleeve 8 is released, whereas the inner sleeve 2 remains securely held with the fastening thread 4 on the first fluid line portion 5. Since release of the fastening thread 4 is not possible particularly in the rotational end position shown in FIGS. 2 and 4, and since in this rotational end position the inner sleeve 2 and the outer sleeve 8 are freely rotatable in relation to one another, the security adapter 1, 1' remains securely and firmly held with the fastening thread 4 of the inner sleeve 2 thereof on the first fluid line portion 5, and the sleeve interior of the inner sleeve 2 and of the outer sleeve 8 remains unreachable to this user for the time being.

It can be seen in FIGS. 1 to 4 that the fastening thread 4 provided for connection to the first fluid line portion 5 is configured as a steep thread or V-thread. In this respect, the fastening thread 4 arranged on the inner sleeve 2 is configured as an inner thread, which interacts with a counter thread provided on the first fluid line portion.

In order that, by contrast, the movement thread formed from the outer thread 6 and inner thread 7 is relatively smooth running compared to the fastening thread 4 and is distinguished by a low degree of friction, the outer thread 6 of the movement thread provided on the inner sleeve 2 is configured as a trapezoidal thread.

Figure 8:
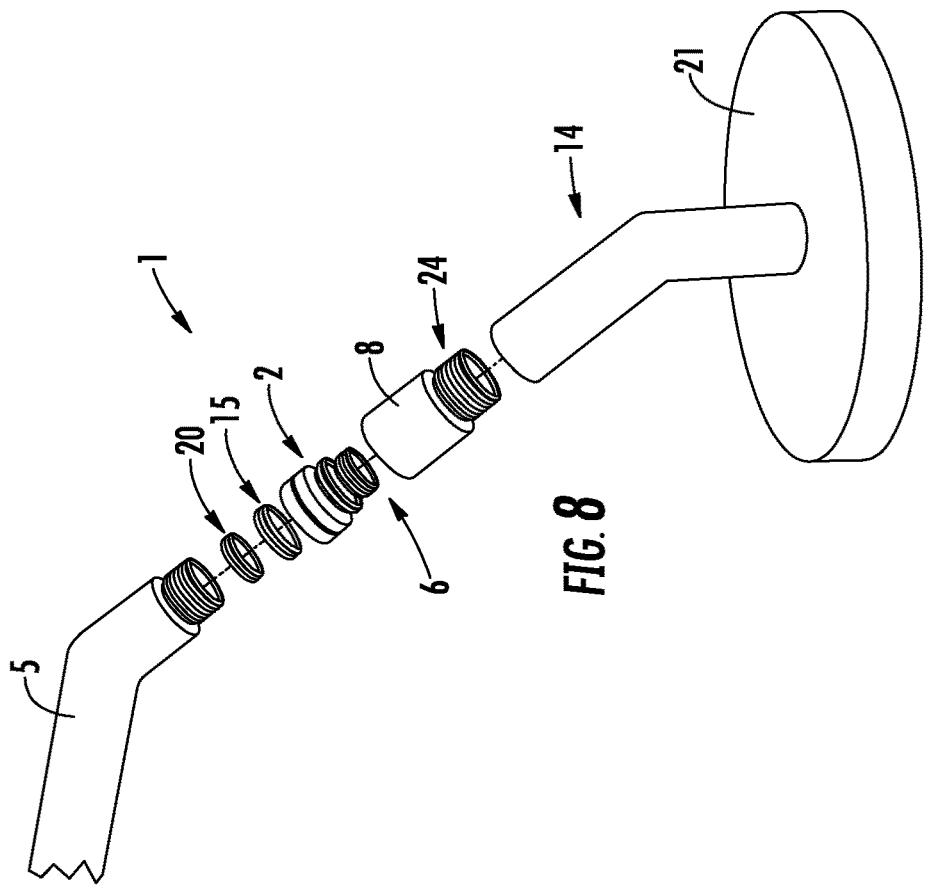
FIG. 8 shows the exemplary application shown in FIG. 7 in an exploded illustration of the required individual parts.

It becomes clear from FIGS. 1 to 4 and in particular also from FIG. 8 that the outer sleeve 8 bears an outer thread 24 for connection to a second fluid line portion 14.

Figure 3:
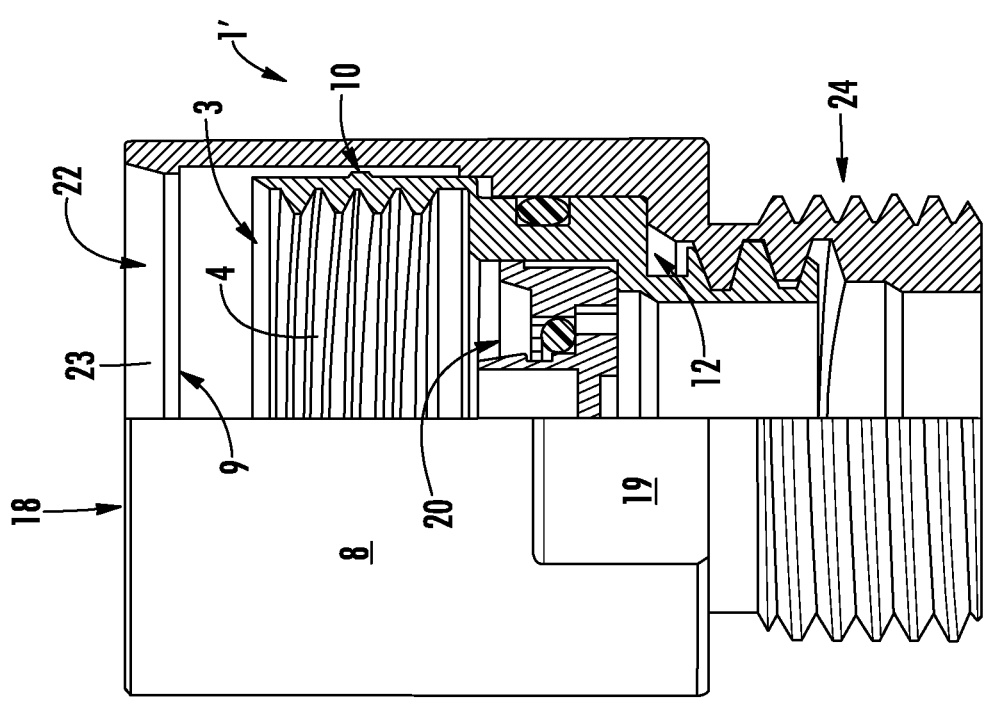
Figure 7:
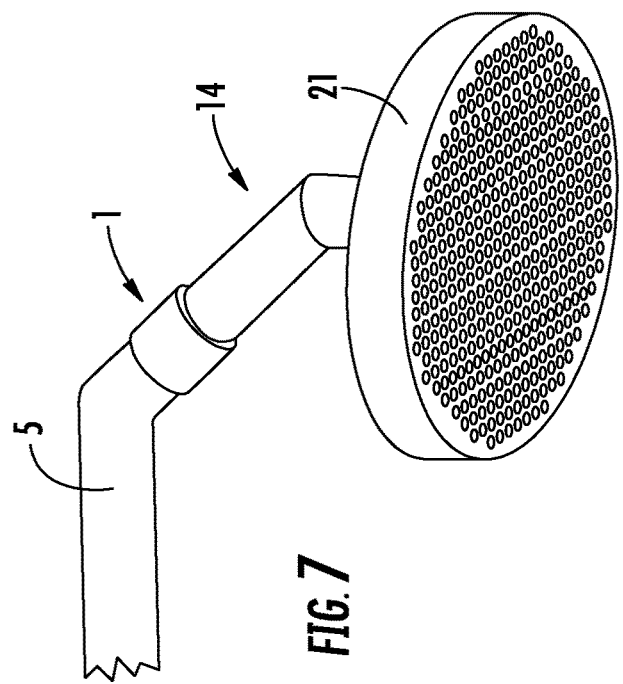
FIG. 7 shows the security adapter shown in FIGS. 1 to 6 in an exemplary application, in which exemplary application the security adapter connects a shower spray head to an inflow-side fluid line portion.

From a comparison of FIGS. 1 and 3, which show the screwed end position, and of FIGS. 2 and 4, which show the rotational end position of the security adapter 1, 1', it becomes clear that provision is made of at least one ring seal 15, which seals an annular gap that remains between the inner sleeve 2 and the outer sleeve 8. For this purpose, an annular groove 16 which serves for receiving a sealing ring serving as the ring seal 15 is provided on the sleeve outer circumference of the inner sleeve 2. Whereas this ring seal 15 seals the annular gap in the screwed end position shown in FIGS. 1 and 3, in the rotational end position of the security adapter 1, 1' shown in FIGS. 2 and 4 this ring seal 15 is arranged in the region of a cross-sectional widening 16 of the clear sleeve cross section of the outer sleeve 8 in such a manner that the ring seal 15 is functionless and the annular gap that remains between the outer sleeve 8 and the inner sleeve 2 is therefore permeable to fluid. If a rotational motion is performed on a security adapter 1, 1' which has been installed in an application, in order in particular to impermissibly release or to remove this security adapter, initially only the inner sleeve 2 is released from the outer sleeve 8 on account of the greater pitch of the movement thread, formed from the outer thread 6 and inner thread 7, compared to the fastening thread 4 on the inner sleeve 2. In the process, the security adapter 1, 1' is twisted from its screwed end position into its rotational end position, in which rotational end position the ring seal 15 loses its function and the, possibly also unauthorized, tampering on the security adapter 1, 1' becomes noticeable through water running out of the security adapter 1, 1' via the annular gap. In the rotational end position shown in FIGS. 2 and 4, too, however, the security adapter 1, 1' remains held with the fastening thread 4 of the inner sleeve 2 thereof on the first fluid line portion 5. The fixed retention of the security adapter 1, 1' on the first fluid line portion 5 is itself ensured when the second fluid line portion 14 is released from the security adapter 1, 1' by relative twisting with respect to the outer sleeve 8 of the latter.

From a comparison of FIGS. 1 and 3 on the one hand and of FIGS. 2 and 4 on the other hand, it also becomes clear that, in the rotational end position of the security adapter 1, 1', the inner sleeve protrudes beyond the adjacent end face 18 of the outer sleeve 8 by way of a sleeve end region 17 facing toward the first fluid line portion 5. The security adapter embodiments 1, 1' shown in FIGS. 1 to 4 are essentially of identical construction; merely in the security adapter embodiment 1, 1' shown in FIGS. 3 and 4 is provision made, on the outer sleeve 8, of a tool engagement surface, which here is formed by at least one circumferential spanner engagement surface 19.

As becomes clear from the partial longitudinal sections shown in FIGS. 1 and 4, a flow rate regulator 20 is inserted into the inner sleeve 2 into the sleeve inner space of the inner sleeve 2 from the sleeve opening which faces toward the first fluid line portion 5. This flow rate regulator 20, which is secured against unauthorized tampering in the security adapter 1, 1', is intended to adjust the flow rate of the water flowing through spontaneously and therefore virtually automatically to a stipulated maximum value. The security adapter 1, 1', which connects the first and the second line portion 5, 14 of a fluid line to one another, is provided for the connection of a shower hose or—as is shown in the exemplary application shown in FIGS. 7 and 8—for the connection of a spray head 21. In this case, the second line portion 14 is in the form of a spray head 21 or is a component part of such a spray head 21, which is connected to the first fluid line portion serving as a water intake via the security adapter 1 serving as a coupling piece.

In order for its outer thread 6 to be screwed into the inner thread 7 of the outer sleeve 8, the inner sleeve 2 can be inserted into the sleeve inner space of the outer sleeve 8 by way of an end-side insertion opening 22 in the latter. In order that the counter stop 10 of the inner sleeve 2 can overcome the stop 9 provided on the sleeve inner circumference of the outer sleeve 8 during the insertion operation, a preferably circumferential insertion bevel 23 which widens conically in the insertion direction is arranged upstream of the stop 9.

In order to make it possible for an appropriate torque to be applied to the outer sleeve 8 and in particular to the tool engagement surfaces arranged on the outer sleeve 8, it is advantageous if the outer sleeve 8 is produced from metal and preferably from brass. By contrast, the inner sleeve 2 can be produced not only from metal, but also from a suitable plastic, for example from polyoxymethylene (POM) plastic.

LIST OF REFERENCE SIGNS

1, 1' Security adapter
2 Inner sleeve
3 First sleeve end region
4 Fastening thread
5 First fluid line portion
6 Outer thread
7 Inner thread
8 Outer sleeve
9 Stop
10 Counter stop
11 Cross-sectional widening
12 Stop surface
13 Counter stop surface
14 Second fluid line portion
15 Ring seal
16 Annular groove
17 Sleeve end region
18 End face
19 Spanner engagement surface
20 Flow rate regulator
21 Spray head
22 Insertion opening
23 Insertion bevel
24 Outer thread

The invention claimed is:

1. A security adapter comprising:
an inner sleeve,
an outer sleeve,
the inner sleeve having a first sleeve end region with a fastening thread provided for connection to a first fluid line portion and a second sleeve end region having an outer thread provided as a movement thread,
said outer thread is screwed together with an inner thread of the outer sleeve,
the inner sleeve is screwed by way of the outer thread thereof into the inner thread of the outer sleeve to a screwed-in end position such that a stop surface on the inner sleeve bears against a counter stop surface on the outer sleeve, and
a sleeve inner circumference of the outer sleeve is provided with a stop, against which a counter stop arranged on an outer circumference of the inner sleeve bears, in a rotational end position of the security adapter, such that the inner sleeve and the outer sleeve are freely rotatable in relation to one another without engagement of the inner and the outer thread that forms the movement thread.

2. The security adapter as claimed in claim 1, wherein the fastening thread provided for connection to the first fluid line portion is configured as a steep thread or V-thread.

3. The security adapter as claimed in claim 1, wherein the fastening thread arranged on the inner sleeve is an inner thread.

4. The security adapter as claimed in claim 1, wherein the outer thread of the movement thread provided on the inner sleeve is a trapezoidal thread.

5. The security adapter as claimed in claim 1, wherein the outer sleeve bears an outer thread for connection to a second fluid line portion.

6. The security adapter as claimed in claim 1, further comprising at least one ring seal, which seals an annular gap between the inner sleeve and the outer sleeve in the screwed-in end position.

7. The security adapter as claimed in claim 6, wherein at least one annular groove that receives the at least one ring seal is provided on the sleeve outer circumference of the inner sleeve.

8. The security adapter as claimed in claim 6, wherein, in the rotational end position, the at least one ring seal is arranged in a region of a cross-sectional widening in an open cross sectional area of the outer sleeve such that the at least one ring seal is functionless and the annular gap that remains between the outer sleeve and the inner sleeve is permeable to fluid.

9. The security adapter as claimed in claim 1, wherein, in the rotational end position of the security adapter, the inner sleeve protrudes beyond an end face of the outer sleeve by way of a sleeve end region facing toward the first fluid line portion.

10. The security adapter as claimed in claim 9, wherein a second tool engagement surface is provided on the protruding sleeve end region of the inner sleeve.

11. The security adapter as claimed in claim 10, wherein the tool engagement surface is formed by at least one circumferential spanner engagement surface.

12. The security adapter as claimed in claim 1, wherein a first tool engagement surface is provided on the outer sleeve.

13. The security adapter as claimed in claim 1, wherein at least one of a flow rate regulator, a pressure reduction valve, or a backflow preventer is provided and held releasably in a sleeve inner space of the inner sleeve.

14. The security adapter as claimed in claim 1, wherein the security adapter is adapted to connect a first and a second line portion of a fluid line to one another.

15. The security adapter as claimed in claim 1, wherein the security adapter is adapted to connect an outflow-side first or second line portion in the form of a spray head or shower hose.

16. The security adapter as claimed in claim 1, wherein, in order for the outer thread to be screwed into the inner thread of the outer sleeve, the inner sleeve is insertable into a sleeve inner space of the outer sleeve by way of an end-side insertion opening, and a circumferential insertion bevel which widens conically in an insertion direction is arranged upstream of the stop on the sleeve inner circumference of the outer sleeve.

17. The security adapter as claimed in claim 1, wherein the outer sleeve is produced from metal.

18. The security adapter as claimed in claim 1, wherein the inner sleeve is produced from metal or plastic.

19. The security adapter as claimed in claim 1, wherein the outer thread of the inner sleeve or the inner thread of the outer sleeve has a greater thread pitch than the fastening thread of the inner sleeve.

* * * * *